May 12, 1931.    L. STANKEWITZ    1,805,424
EXPOSURE INDICATING ATTACHMENT FOR CAMERAS
Filed Feb. 21, 1930
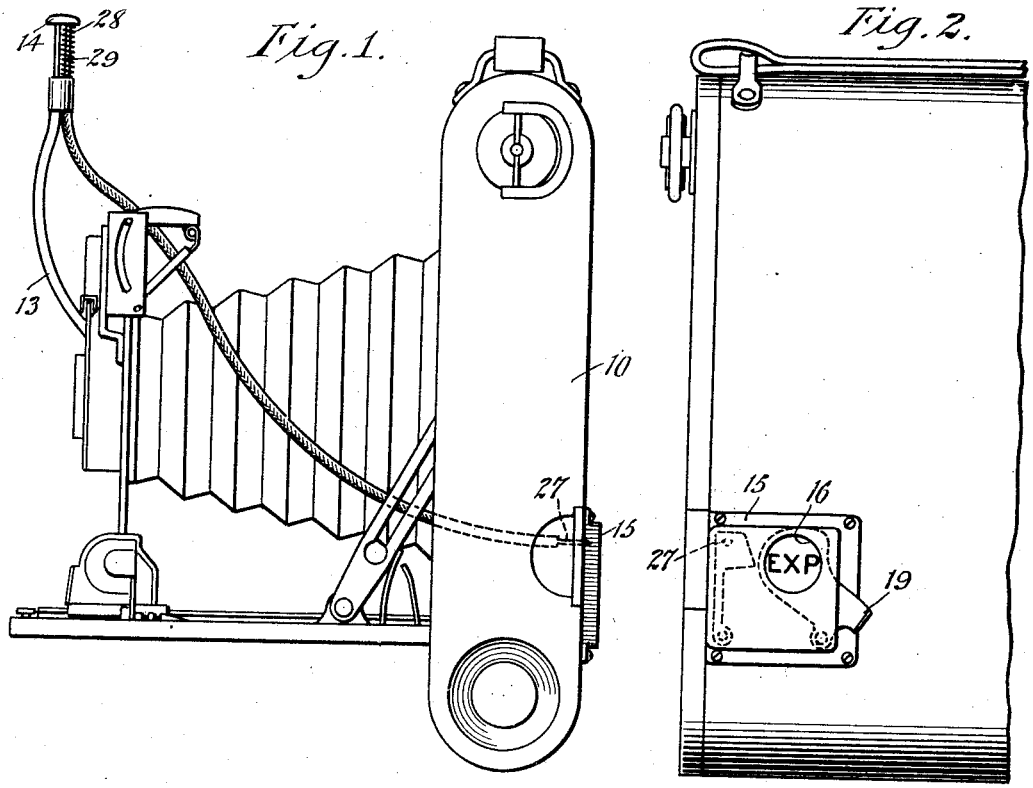
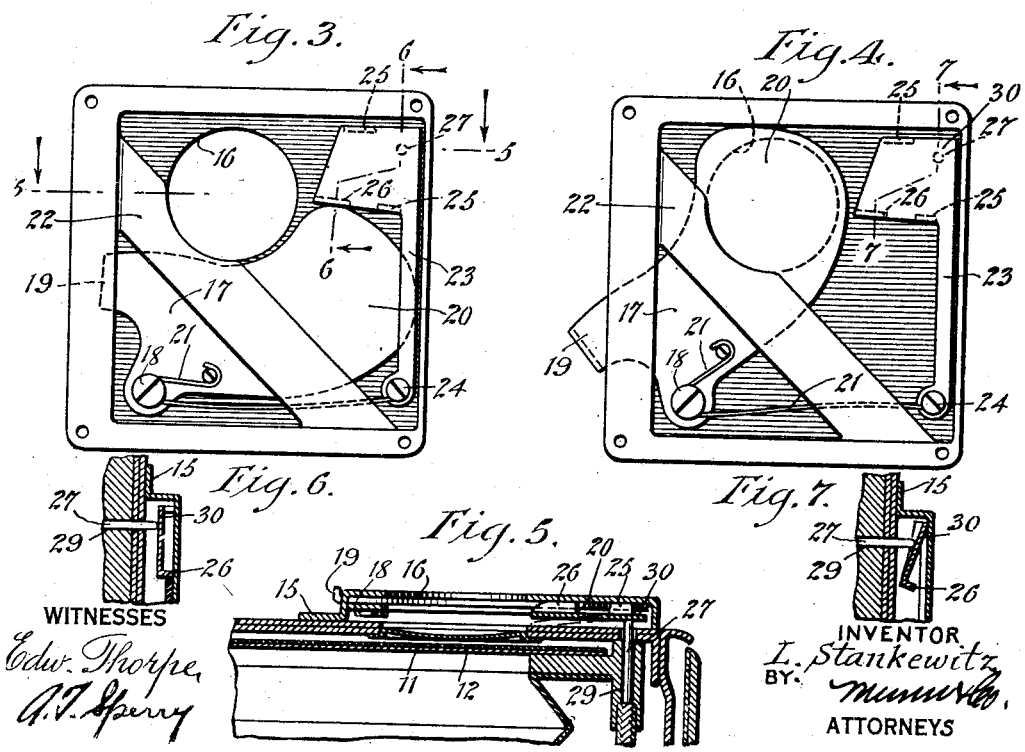

Patented May 12, 1931

1,805,424

UNITED STATES PATENT OFFICE

LOUIS STANKEWITZ, OF NEW YORK, N. Y.

EXPOSURE INDICATING ATTACHMENT FOR CAMERAS

Application filed February 21, 1930. Serial No. 430,349.

This invention relates to cameras.

It is among the objects of the present invention to provide an attachment for cameras which will automatically indicate whether or not the film of the camera has been exposed.

A further object of the present invention is to provide a camera attachment including a shutter movable to close the film-window of a camera after exposure of that portion of the film adjacent thereto.

Another object of the present invention is to provide, in combination, a shutter for a film-window including an operating means associated with the lens-shutter whereby operation of the lens-shutter will permit movement of the film-window shutter simultaneously therewith.

A further improved object of the present invention is to provide a camera accessory adapted to be mounted on conventional cameras of the present-day type for actuation with the lens-shutter to indicate that the film has been exposed.

Further objects of the present invention include the novel construction, combination and interrelation of parts whereby the whole forms a simple camera accessory readily designed to meet the demands of economic manufacture.

Other objects of the present invention will be apparent from a consideration of the following specification, taken in conjunction with the accompanying drawings, in which,—

Figure 1 is a side elevation of a camera of conventional form embodying the present invention, the camera being in opened position.

Figure 2 is a fragmentary rear elevation of the camera shown in Fig. 1.

Fig. 3 is an elevational view of the present device with the cover removed.

Fig. 4 is a similar view with the shutter in position to close the film-window.

Fig. 5 is a sectional view taken on lines 5—5 of Fig. 3.

Fig. 6 is a sectional view taken on lines 6—6 of Fig. 3.

Fig. 7 is a sectional view taken on lines 7—7 of Fig. 4.

Referring more particularly to the drawings, it will be seen that the device is here illustrated as applied to a conventional, folding-type camera. The invention is, however, in no way restricted to this particular type of camera and may be obviously modified for conformity with other types. The camera herein shown is generally indicated by the numeral 10, and includes the usual film-window 11 in the back of the camera. This window is illustrated as being of conventional type, and including the ruby lens in front of which the film 12 passes, it being understood that the film bears numerals or other indicia adapted to indicate when the film has been properly positioned to have the unexposed portion in proper position behind the lens of the camera. For actuating the lens, the usual flexible operating assembly indicated by the numeral 13 is provided, the assembly terminating in a pushbutton 14, inward movement of which is adapted to open and close the lens in the conventional manner.

The present invention includes an apertured casing 15, which is adapted to be screwed or otherwise secured to the back of the camera over the film-window 11. The casing 15 includes an opening 16 which registers with the film-window and further includes therein the shutter 17, pivotally associated in the casing by the screw 18. The shutter includes a turning angularly bent tongue 19 by which it may be moved from an exterior to contracted position shown in Figure 3, which leaves the window 11 exposed to view. The body 20 of the shutter is adapted to move under the influence of a spring 21, to close the aperture 16, as indicated in Figure 2, the body preferably having indicia on its outer face as indicated in Figure 2, to show that the portion of the film thereunder has been exposed. The housing 15 also includes a guide 22 between which and the outer side of the housing the shutter moves.

For securing the shutter in retracted position shown in Figure 3, a shutter latch 23 is provided, a depending end of which is secured with the end of the spring 21 by the screw 24. The opposite end of the latch is enlarged and is provided with diametrically opposite angularly bent bearing flanges 25 which bear against the inner face of the outer side of the casing 15. Due to the flexibility of the material of the latch 23 and its securement at a position remote from the enlarged end, the latch is rockable about the bearings 25. The enlarged end of the latch includes at one corner, a securing flange 26, behind which the latch is adapted to be locked as shown in Figure 3.

For rocking the latch to the position shown in Figs. 4 and 7 to release the shutter whereby the spring 21 will force over to close the aperture 16, a flexible operating cable 27 is provided, one end of which is associated with the button 14 as indicated at 28, whereby the inward movement of the button forces the cable inward, the spring 29 being provided to normally retain the cable in its extended position shown in Figures 1, 3 and 6. The opposite end of the cable is received through a guiding aperture 29 of the normal camera frame. The extremity of the cable bears agaist one portion of the latch diametrically opposite from the projection 26 as indicated at 30.

In the operation of the device, when the camera is about to be used, the film is moved in conventional manner to bring an unexposed portion thereof into the field of the camera lens. To do this, it is necessary to move the shutter 17 to retracted position shown in Figure 3 by pressure on the extended tongue 19. The normal flexibility of the latch provides for the movement of the shutter thereunder and secures it in the retracted position as shown by Fig. 6. When the film is exposed by movement of the button 14 opening the lens-shutter, the cable 27 moves inwardly with the button 14 and the latch is rocked about its bearings 25 to release the shutter 17 as indicated in Fig. 7. The spring 21 acts to move the shutter to close the film-window. When the operator of the camera sees that the window is shut, he will know that the film has been exposed and will then repeat the operation, it being impossible to properly move the film without resetting the film-window shutter.

From the foregoing it will readily be seen that the present invention provides a novel and improved device which is not restricted to specific structural details as herein enumerated, but which may be subjected to various changes, modifications, and the full use of equivalents, without departing from the spirit or scope of the present invention, as outlined in the appended claims.

What is claimed is:

1. An attachment for cameras including a casing over the film window, a shutter within said casing for closing said film window, a latch within said casing for controlling said shutter, and means for moving said latch to release said shutter to close said window upon movement of the lens shutter of the camera, said latch having an enlarged end with bearing members and a remote end secured to said casing.

2. An attachment for cameras including a casing over the film window, a shutter within said casing for closing said film window, a latch within said casing for controlling said shutter, means for moving said latch to release said shutter to close said window upon movement of the lens shutter of the camera, said latch having an enlarged end with bearing members and a remote end secured to said casing, and a flexible cable adapted to rock said latch about said bearings to release said shutter.

3. An attachment for cameras including a casing over the film window, a shutter within said casing for closing said film window, a latch within said casing for controlling said shutter, means for moving said latch to release said shutter to close said window upon movement of the lens shutter of the camera, said latch having an enlarged end with bearing members and a remote end secured to said casing, and a flexible cable adapted to rock said latch about said bearings to release said shutter, said cable being associated with the lens shutter operating cable for movement therewith.

4. In a device of the class described, the combination of a window closing shutter mounted for movement to an opened position and a closing position, a flexible latch which has one end thereof rigidly secured and its opposite end having provision engageable with said shutter to retain said shutter in its opened position in the normal position of the latch, means to flex the latch to release the shutter for movement to its closing position, and yieldable means to move said shutter to its closing position.

5. In a device of the class described, the combination of a window closing shutter mounted for pivotal movement to an opened position and a closing position, a flexible latch which has one end thereof rigidly secured and its opposite end having provision engageable with said shutter to retain said shutter in its opened position in the normal position of the latch, means to flex the latch to release the shutter for movement to its closing position, and yieldable means to move said shutter to its closing position.

6. In a device of the class described, the combination of a window closing shutter mounted for movement to an opened position and a closing position, a flexible latch which has one end thereof rigidly secured and its opposite end having provision engageable with said shutter to retain said shutter in its opened position in the normal position of the latch, yieldable means to move said shutter to its closing position when released, and means including bearing members on said latch to flex the latch to release the shutter.

7. In an exposure indicating device for a camera, the combination of a casing adapted to be arranged in fixed relation to the film window of the camera, said casing having a sight opening therein for registry with said window, a shutter mounted for movement within said casing to an opened position and to a position to close said opening, means constantly acting on said shutter to cause the movement of the shutter to a position to close the opening, a flexible latch member having its lower end secured to said casing and its upper end being engageable with said shutter to hold the latter in the opened position when the latch is in its normal position, and means to flex the latch to release said shutter for movement to its closing position.

Signed at New York, in the county of New York and State of New York, this 19th day of February A. D. 1930.

LOUIS STANKEWITZ.